United States Patent Office 3,149,695
Patented Sept. 22, 1964

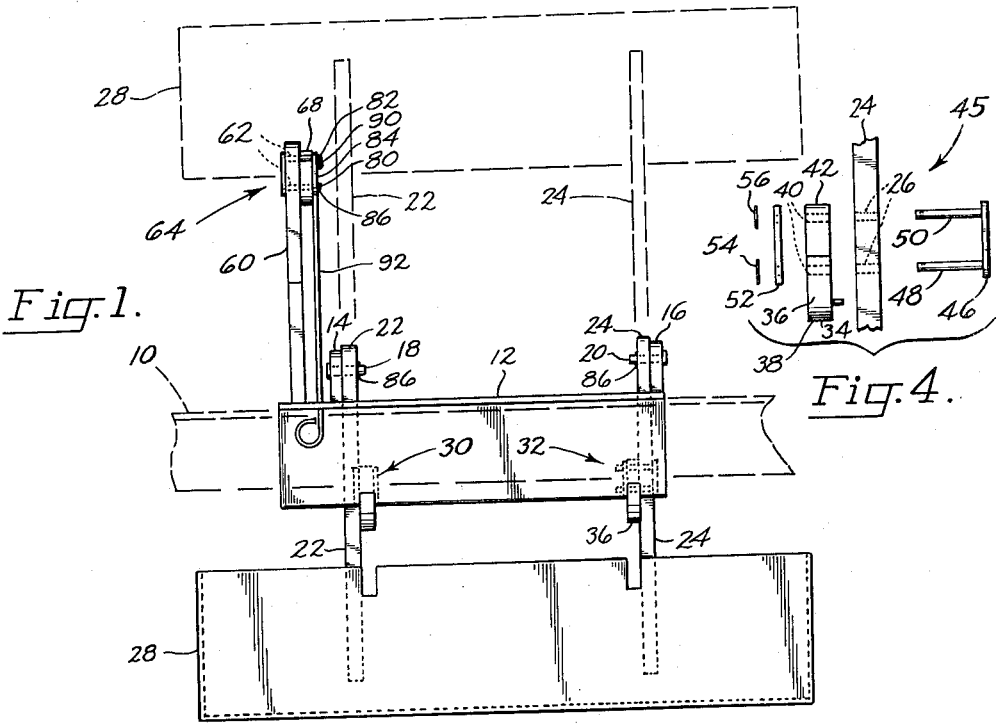
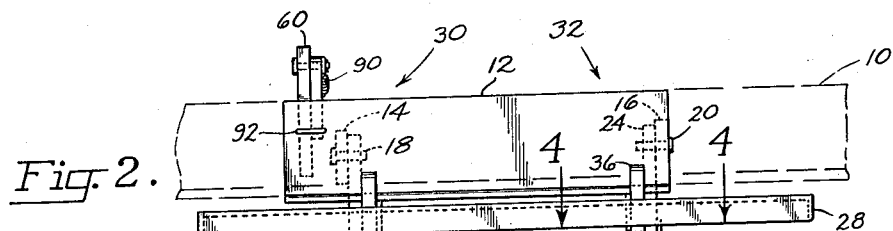
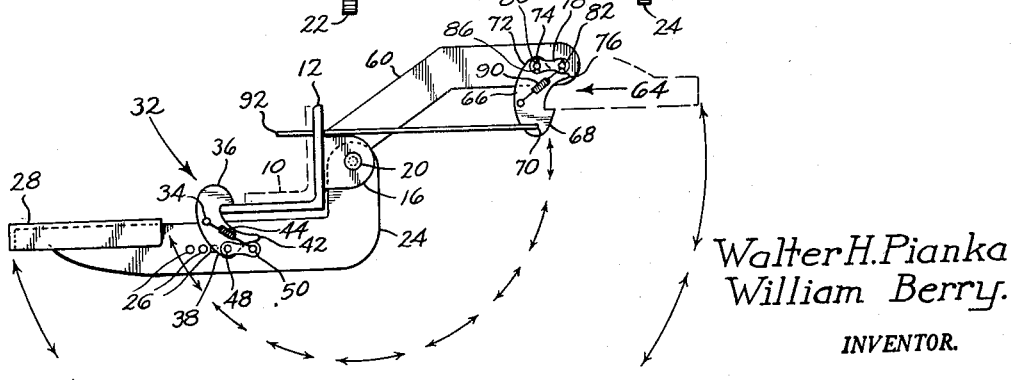
Walter H. Pianka
William Berry.
INVENTOR.

1

3,149,695
RETRACTABLE STEP
Walter H. Pianka, 837 4th St., and William Berry, Rte. 1, Box 114L, both of Yreka, Calif.
Filed Jan. 28, 1963, Ser. No. 254,330
8 Claims. (Cl. 182—91)

This invention relates to retractable steps of the class employed particularly for attachment to the rear bumper of a house trailer, the step being advanced and operative when the trailer is stationary, and retracted and stored when the trailer is in motion.

It accordingly is the general object of the present invention to provide a retractable step which is widely applicable, which is rapid and easy to operate, which is stable and safe when in operative position, which does not become fouled with dirt and gravel when applied to a traveling trailer, which may be built economically from relatively few parts, and which has a long service life.

The retractable step having the foregoing advantages is described in the accompanying specification and claims and illustrated in the accompanying drawings, wherein:

FIG. 1 is a plan view of the herein described retractable step illustrated in its extended and retracted positions;

FIGS. 2 and 3 are views in front and side elevation, respectively, of the step of FIG. 1; and FIG. 4 is a detail, exploded view looking in the direction of the arrows of line 4—4 of FIG. 2, and illustrating the latch mechanism employed in the retractable step of the preceding figures.

Broadly stated, the retractable step of our invention compises a pair of laterally spaced step arms, hinge means hinging one end of the arms in a horizontal frame member for parallel swinging movement beneath the frame member, and a step mounted across the other end of the arms. First latch means are positioned for releasably securing the arms to the frame in an advanced operative position. Second latch means are positioned for releasably securing the arms in their retracted storage position.

Thus, in use, the step may be released readily from its retracted, storage position and swung beneath the frame member to its extended operative position. This operation then may be reversed when it is wished to return the step to its storage position.

Considering the foregoing in greater detail and with particular reference to the drawings:

In the drawings, the step is illustrated in its attachment to a frame member 10 which conveniently may be an angle iron bumper of a house trailer having a rearwardly opening door with which the step is to be associated.

To facilitate attachment of the step assembly to the bumper, there is provided a mounting which may be shaped and sized to conform to the frame member to which it is to be connected. In the illustrated form of the invention the mounting comprises an angle iron 12 which is bolted or welded to the frame member 10, centrally with respect to the trailer door. Flat bar or other types of mountings may be used, however, depending upon the requirements of each particular installation.

Mounting 12 supports a step assembly for swinging movement beneath the frame member. To this end it is provided with a pair of rearwardly extending tabs 14, 16 to which are pivoted by means of pins 18, 20 a pair of angled step arms 22, 24.

As seen in FIG. 3 each step arm is angled in such a manner as to conform to the shape of mounting 12. Its central portion is provided with a plurality of longitudinally spaced openings of perforations 26, the purpose of which is to mount adjustably the step latching means, as will appear hereinafter. A skirted step 28 is fixed across, and supported by, the outer ends of arms 22, 24.

2

First latch means are provided for releasably latching the step in its extended operative position. The latch assemblies used for this purpose are indicated generally at 30, 32. The construction of each latch assembly is illustrated in detail in FIGS. 3 and 4.

Thus there is provided a latch member 34 having a latch head 36 contoured to engage the lip of mounting member 12 or other frame member. Latch 34 also is provided with a latch base 38 having therethrough a transverse perforation 40 sized to register with a selected one of perforations 26 in step arms 24. A spaced distance from latch base opening 40 is a latch base abutment 42 which serves to station the latch head in operative position. A coil spring 44 stretched between the latch head and a structural member assists in this purpose.

A pivot pin is provided for pivotally mounting latch member 34 on step arm 24. A stop pin also is provided for engagement with latch base abutment 42 and hence for positioning the latch head.

In the preferred and illustrated embodiment, these two pins are included in a roller chain connecting link, indicated generally at 45, and shown particularly in FIG. 4.

Link 45 includes a first side plate 46 from the side face of which extend rigidly fixed pins 48, 50. The first of these, pin 48, is insertable through one of openings 26 in the step arm, as determined by the dimensions of mounting 12, and through registering latch base opening 40. The second of the pins, pin 50, is insertable through an adjacent step arm opening 26, the extending portion serving as a stop against which bears latch base abutment 42. A removable link side plate 52 may be slipped over the free ends of pins 48, 50 and retained in place by cotter keys 54, 56. Accordingly latch 34 may be secured in the working position required by the dimensions of mounting member 12.

Second latch means are provided for holding the step in its retracted storage position, out of sight behind bumper or frame member 10.

The second latch assembly is supported by a support arm 60 which is welded or otherwise fixed to the back of mounting member 12 and extends rearwardly and upwardly the predetermined distance. At the end of the arm there are a pair of longitudinally spaced openings 62 which correspond in function to openings 26 in step arms 22, 24.

Mounted in openings 62 is a latch assembly indicated generally at 64. This assembly is constructed like the latch assembly described above. It includes a latch member 66 having an appropriately contoured latching head 68 positioned for engaging the lip of step 28 when it is in inverted storage position.

The latch head 68 is provided with an opening 70. The latch base 72 is provided with a latch base opening 74 and a spaced latch base abutment 76.

As in the previously described latch assemblies, a pair of pins is provided for mounting and positioning the latch. These pins may be included to advantage in a roller chain connecting link assembly including back plate 78, pivot pin 80 and stop pin 82.

Pivot pin 80 is insertable in registering support arm opening 62 and latch base opening 74. Stop pin 82 is insertable in the companion support arm opening 62 and serves as a stop for latch base abutment 76. A removable connecting link face plate 84 is positioned over the extending outer ends of the pins and held in position by cotter keys 86.

A spring 90 interconnects the latch head and the support member, thereby tensioning the latch head. A release or trip rod 92 extends from the latch head to a trip location outside mounting member 12 for releasing the latch.

Operation

The operation of the presently described retractable step is as follows:

When the step is in use, it is in the full line position of FIGS. 1 and 3. It is supported in this position on bumper or frame member 10 by companion latch assemblies 30, 32, each being mounted in a selected pair of openings 26 in the step support arms as determined by the width of member 12 by which the step is mounted on the bumper.

When it is desired to retract the step, latch assemblies 30, 32 are released manually and the step swung beneath the bumper to the dotted line position of FIGS. 1 and 3.

There the lip of the step engages latch assembly 64, which is supported on a rearwardly extending support arm 60. It is held securely in this position until its release is desired. This may be accomplished by pulling trip rod 92, whereupon the step again is rendered operative.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. A retractable step comprising:
   (a) a pair of laterally spaced step arms each provided with a plurality of spaced longitudinally arranged openings,
   (b) hinge means hinging one end of the arms to a horizontal frame member for parallel swinging movement beneath the frame member,
   (c) a step mounted across the other end of the arms,
   (d) first latch means positioned for releasably securing the arms to the frame member in an advanced, operative position and comprising a latch member mounted movably on each arm and each having a latch head shaped to engage the frame member, and a latch base having a transverse opening and spaced abutment, and a pair of pins dimensioned for reception in the arm openings, one pin being a pivot pin dimensioned also for reception in the latch base opening when registering with a selected arm opening, the other being a stop pin for engagement with the abutment, thereby maintaining the latch head in latching position,
   (e) and second latch means positioned for releasably securing the arms in a retracted, storage position.

2. The retractable step of claim 1 including resilient means interconnecting each latch head and associated arm for maintaining the latch head in latching position.

3. The retractable step of claim 1 including a pair of roller chain connecting links, each connecting link providing the said pivot pin and the said stop pin.

4. The retractable step of claim 1 wherein the second latch means comprises a support arm attached to and extending rearwardly from a frame member and having a pair of longitudinally spaced perforations at the rearward end thereof, a latch including a latch head and a latch base, the latch base having a transverse perforation and a spaced abutment, and a pair of pins dimensioned one to penetrate one of the perforations through the support arm and the perforation through the latch base, serving as a pivot and the other to seat in the other of the perforations through the support arm, serving as a stop for the abutment.

5. The retractable step of claim 4 including a roller chain connecting link, the connecting link supplying the pivot pin and the stop pin.

6. The retractable step of claim 4 including resilient means interconnecting the latch head and the support arm for maintaining the latch head normally in a position of step engagement.

7. The retractable step of claim 4 including a pull rod fastened to the latch head and extending to an accessible position with respect to the frame member for use in unlatching the latch head from the step.

8. A retractable step comprising a pair of laterally spaced step arms, hinge means hinging one end of the step arms to a horizontal frame member for parallel swinging movement beneath the frame member, a step mounted across the opposite end of the step arms, the step arms being provided with a plurality of longitudinally arranged spaced openings transversely therethrough, the step arms and step being swingable between an advanced operative position and a retracted storage position, a support arm mounted on a frame member and extending rearwardly to the retracted storage position of the step and steps arms, the support arm having a pair of spaced openings transversely therethrough; and three latch assemblies, each comprising a latch head, a latch base having an opening therethrough and an abutment spaced therefrom, a roller chain connecting link including a pair of spaced pins, one pin being insertable in one of the arm openings and the latch base opening, serving as a pivot pin, and the other being insertable in an adjacent arm perforation and serving as a stop for the latch base abutment, and resilient means interconnecting the latch head and a support member for maintaining the latch head in latching position; two of the latch assemblies being mounted movably on the step arms, one on each arm, and the third latch assembly being mounted movably on the support arm, the latch assemblies on the step arms being operable to releasably engage the step on a frame member in advanced operative position, and the latch assembly on the support arm being operative to releasably engage and support the step in its retracted storage position.

References Cited in the file of this patent

UNITED STATES PATENTS

| | | |
|---|---|---|
| 2,299,584 | Low | Oct. 20, 1942 |
| 2,575,615 | Crump | Nov. 20, 1951 |
| 2,670,968 | Duffy | Mar. 2, 1954 |
| 2,738,987 | McDonald | Mar. 20, 1956 |